US012159512B1

(12) United States Patent
Chinn

(10) Patent No.: US 12,159,512 B1
(45) Date of Patent: Dec. 3, 2024

(54) ROULETTE WAGERING SYSTEM WITH MULTIPLE PAYOUTS

(71) Applicant: R L Chinn, Las Vegas, NV (US)

(72) Inventor: R L Chinn, Las Vegas, NV (US)

( * ) Notice: Subject to any disclaimer, the term of this patent is extended or adjusted under 35 U.S.C. 154(b) by 0 days.

(21) Appl. No.: 16/988,663

(22) Filed: Aug. 9, 2020

Related U.S. Application Data

(63) Continuation of application No. 16/052,798, filed on Aug. 2, 2018, now Pat. No. 10,769,893, which is a continuation-in-part of application No. 15/831,389, filed on Dec. 4, 2017, now abandoned.

(60) Provisional application No. 62/593,925, filed on Dec. 2, 2017, provisional application No. 62/457,305, filed on Feb. 10, 2017.

(51) Int. Cl.
*G07F 17/32* (2006.01)
*G07F 17/34* (2006.01)

(52) U.S. Cl.
CPC ...... *G07F 17/3267* (2013.01); *G07F 17/3211* (2013.01); *G07F 17/329* (2013.01); *G07F 17/34* (2013.01); *G07F 17/322* (2013.01)

(58) Field of Classification Search
CPC .................................. A63F 5/00; G07F 17/32
See application file for complete search history.

(56) References Cited

U.S. PATENT DOCUMENTS

2016/0054966 A1* 2/2016 Dinning .................. A63F 13/52
463/17

* cited by examiner

*Primary Examiner* — Omkar A Deodhar
(74) *Attorney, Agent, or Firm* — Muskin and Farmer LLC

(57) ABSTRACT

An electronic roulette wagering method, apparatus, and computer readable storage which displays a set of twelve bonus symbols. Each of the twelve bonus symbols is associated only with a row of three adjacent numbers. If on each spin of the roulette wheel, the ball lands on one of the associated three numbers, then the wager wins and a payout is made. Typically, a payout on a second (and thereafter) consecutive winning spin is higher than a payout for the first winning spin.

3 Claims, 6 Drawing Sheets

ROULETTE WAGERING SYSTEM WITH MULTIPLE PAYOUTS

CROSS REFERENCE TO RELATED APPLICATIONS

This application is a continuation in part to U.S. application Ser. No. 15/831,389, which claims benefit to U.S. provisional applications 62/457,305 and 62/593,925, all three of which are incorporated by reference herein in their entireties. U.S. application Ser. No. 16/052,798 is incorporated by reference herein in its entirety.

BACKGROUND OF THE INVENTION

Field of the Invention

The present general inventive concept is directed to a method, apparatus, and computer readable storage medium directed to a variation of the casino game of roulette.

SUMMARY OF THE INVENTION

It is an aspect of the present invention to provide an exciting casino game.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1A:
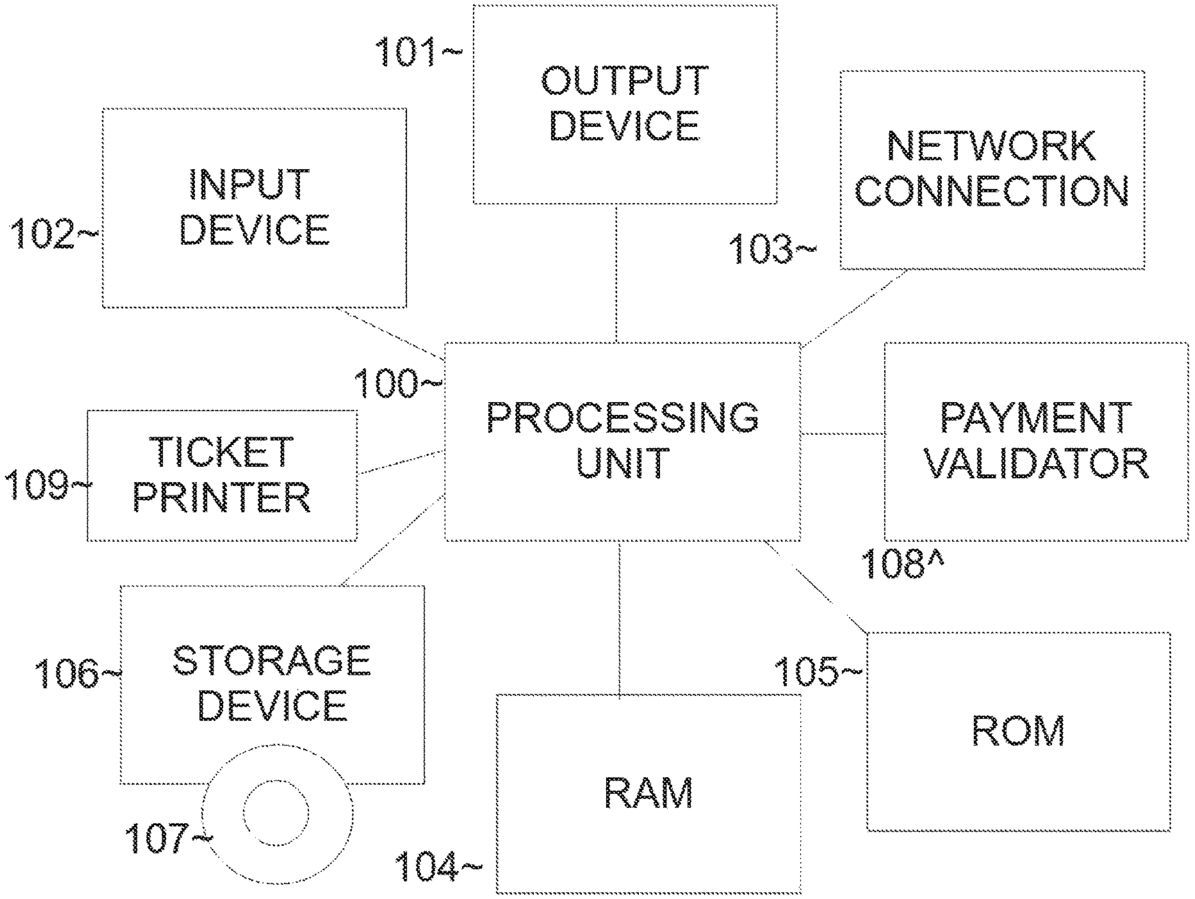
FIG. 1A is a block diagram illustrating exemplary hardware that can be used to implement an electronic version of the methods described herein.

Reference will now be made in detail to the presently preferred embodiments of the invention, examples of which are illustrated in the accompanying drawings, wherein like reference numerals refer to like elements throughout.

The present inventive concept relates to a method, apparatus, and computer readable storage medium to implement a casino roulette game. Such a game is described in U.S. Pat. Nos. 8,517,384 and 8,028,993, which are both incorporated by reference herein in their entireties.

FIG. 1A is a block diagram illustrating hardware that can be used to implement electronic versions of the wagering methods described herein, according to an embodiment. The hardware can be, for example, an electronic gaming machine (EGM) used in casinos. The hardware can also be a personal computer, playing the game using the Internet at an Internet casino for real money. The hardware can also be a digital casino table, for example the kind described in U.S. Pat. No. 7,775,887, which is incorporated by reference herein in its entirety. The hardware can also be any computing device, such as a cellular phone, tablet, etc., and the methods described herein can be installed as software (e.g., an app) on the device. The hardware can also be any other type of device, working individually or in conjunction with other devices. The hardware can also be a digital roulette table. In addition to the game being capable of being played in a physical form (using a physical roulette wheel and a betting layout in which players place physical chips), the game can also be played electronically on a video slot machine (the kind that is found in physical casinos).

A processing unit 100 (such as a microprocessor and any associated components) is connected to an output device 101 (such as an LCD monitor, touch screen, CRT, etc.) which is used to display to the player any aspect of the method (e.g., a virtual roulette wheel (including all of the bonus symbols (indicia), virtual felt, etc.), and an input device 102 (e.g., buttons, a touch screen, a keyboard, mouse, etc.) which can be used to input from the player any decision made by the player. All methods described herein can be performed by the processing unit 100 by loading and executing respective instructions. Multiple such processing units can also work in collaboration with each other (in a same or different physical location). The processing unit 100 can also be connected to a network connection 103, which can connect the electronic gaming device to a computer communications network such as the Internet, a LAN, WAN, etc. The processing unit 100 is also connected to a RAM 104 and a ROM 105. The processing unit 100 is also connected to a storage device 106 which can be a disk drive, DVD-drive, CD-ROM drive, flash memory, etc. A non-transitory computer readable storage medium 107 (e.g., hard disk, CD-ROM, etc.), can store a program which can control the electronic processing unit to perform any of the methods described herein and can be read by the storage device 106.

The processing unit 100 can also be connected to a payment validator 108. The payment validator 108 can be a bill acceptor (also known as bill validator) which accepts currency, identifies it as being valid (typically by using an optical scanner), and then credits the inserted bill amount to the machine (for example inserting a $10 bill will credit the machine with $10 in credits). The bill acceptor can also accept cashless tickets as part of a 'ticket-in-ticket-out' system, in which tickets (cashless vouchers) have cash value and can be inserted into the payment validator 108. The validator 108 validates the ticket (typically be optically scanning a bar-code), communicating electronically with a casino database to verify the ticket is authentic, and once authenticated then crediting the machine with the respective amount of credits. The payment validator 108 can also include a card reader which can read cards (e.g., with a magnetic stripe or other electronic encoding) so that an account number can be accessed. The cards can be a credit card, player loyalty card, specific casino payment card, or any card that can provide electronic access to a monetary amount owned by the player (owner of the card) which the player can utilize for playing the machine. If such a card is used, then the player can optionally enter (using a keypad) an amount the player wishes to withdraw from the account associated with the card to credit to the machine.

The processing unit 100 can also be connected to a ticket printer 109 which can print tickets (cashless vouchers). The ticket can also be inserted into the bill validator 108 to play the credits that were cashed out. The ticket contains an electronic/optical encoding (e.g., a barcode) so that a ticket reader (e.g., bill validator 108) can scan the ticket and determine how many credits are associated with the ticket (e.g., by retrieving a ticket record in a casino database corresponding to the ticket). When the player cashes out on the machine (indicated to the machine that the player wishes to cash out and terminate by, typically by pressing a button), a ticket is printed by the ticket printer 109 which carries the amount of credits left on the machine. This ticket can then be used to play other machines in the casino by inserting them into that machine's payment validator. The ticket can also be used to redeem for cash by inserting it into a ticket redemption machine (kiosk) which receives a ticket, validates it (typically by scanning the barcode), and then dispenses an identical amount of cash to what the ticket's value is.

While one processing unit is shown, it can be appreciated that one or more such processor can work together (either in a same physical location or in different locations) to combine to implement any of the methods described herein. Programs and/or data required to implement any of the methods/features described herein can all be stored on any non-transitory computer readable storage medium (volatile or non-volatile, such as CD-ROM, RAM, ROM, EPROM, microprocessor cache, etc.)

The processing unit 100 can also be connected to an electronic card reader (not pictured in FIG. 1A). A player's card is a card with an electronically encoded unique identifier (e.g., magnetic stripe) that the player would insert into the card reader. The card reader then reads the electronic encoding on the card and communicates the player's play to the casino database. In this way, the casino database can track this player's play so that the casino can provide this player incentives. For example, every bet ("bet" and "wager" are used synonymously herein) can be communicated to the casino database and stored (associated with this particular player's account as identified on the player's inserted player's card). A player's card reader is described in U.S. Pat. No. 5,655,961 which is incorporated by reference herein in its entirety. A "player's card" is also known in the industry as a "comp card" or "loyalty card."

The game can also be played on an electronic roulette system which utilizes a physical roulette wheel which spins with a physical ball but bets are taken on electronic betting stations. A server (such as that illustrated in FIG. 1A) is connected to a plurality of betting stations (each betting station can also be as illustrated in FIG. 1A and can have a bill validator to accept cash deposits to be converted to playable credits) and also to a physical roulette wheel which is controlled (e.g., spun) electronically and which has a detector to detect which number the ball lands in. Such a structure is illustrated in FIG. 1C. The server 151 can control the physical roulette wheel 150 (typically enclosed in glass so players cannot interfere with the wheel) and cause it to spin and stop, and detect where the ball lands. A plurality of betting stations 152, 153, 154 (there can be any number) accept bets from players on a touch-screen (and/or other input device(c), and the results of the physical roulette wheel 150 is what is used to determine whether the bets players place on the betting stations 152, 153, 154 win or lose. The betting stations 152, 153, 154 can even display a video feed of the roulette wheel 150, as this is what is used to resolve all bets placed on the betting stations 152, 153, 154. As an alternative to the physical roulette wheel 150 being entirely automatic, the physical roulette wheel 150 can also be operated by a human dealer in a same sense that a standard roulette wheel is. In this way, players can enjoy watching a physical roulette wheel while placing bets at electronic betting stations 152, 153, 154 (and any number of additional such stations) so the players do not have to utilize physical chips to place the wagers. Players can deposit cash at the betting stations 152, 153, 154 in a bill validator at each betting station and can cash out (when they desire) at each betting station 152, 153, 154 by receiving a cashless voucher (printed on a ticket printer) for amount of credits (dollars) the player has on the betting station.

Figure 1B:
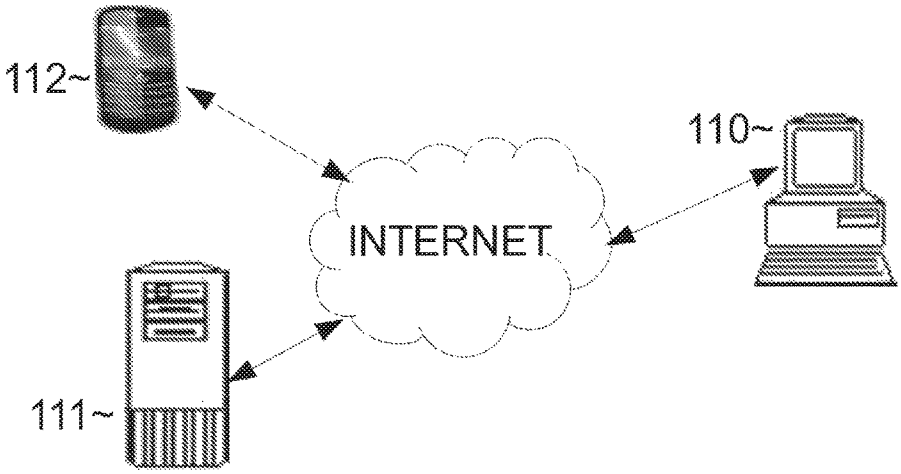
FIG. 1B is a block diagram illustrating an exemplary network configuration to implement a player playing an online version of the methods described herein.
Figure 1C:
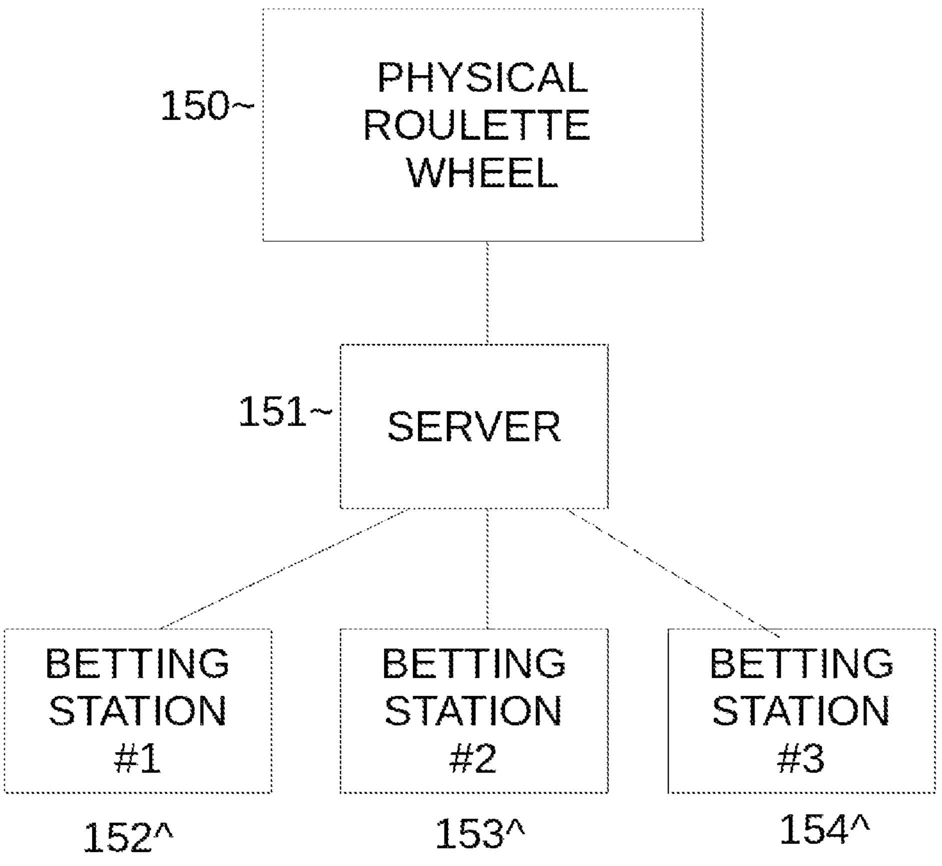
FIG. 1C is a block diagram illustrating a networked roulette wheel with connected electronic betting stations, according to an embodiment.

FIG. 1B is a block diagram illustrating an exemplary network configuration to implement a player playing an online version of the methods described herein. All the methods described herein can be implemented on an online casino for real money (credits which are purchased for cash and are redeemable for cash) or for non-cash value credits. A player uses a personal computer 110 (e.g., cell phone, tablet, PC, etc.) can connect to a server 111 (which can have the structure illustrated in FIG. 5A) using a computer communications network such as the Internet. The server 111 hosts an online casino which determines the outcomes of the game and serves the outcomes to the computer 110 so the computer 110 displays the outcomes to the player. Other users can also play at the online casino hosted by the server 111 simultaneously, such as using a cell phone 112 with wireless internet connectivity. Any number of players connected to the internet can play contemporaneously at the sever 111. The general structure of online casinos is well known in the art.

Methods described herein can also be played on a physical table using physical wheel/balls and physical chips used to place wagers. Such physical chips can be directly redeemable for cash. Different colored chips have different denominations (e.g., white chips are $1, red chips are $5, etc.) and the player can combine chips in any combination to make any wager amount. When a player wins (dealer loses) the player's wager, the dealer will pay that player a respective payout amount. When a player loses (dealer wins) the player's wager, the dealer will take (collect) that wager from the player and typically place those chips in the dealer's chip rack. All rules, embodiments, payouts, features, etc. of a game being played are typically communicated to the player (e.g., verbally or on a written rule card) before the game begins. The roulette wheel would contain a section for each of the numbers displayed (38 sections total) on the betting layout (e.g., 0, 00, 1-36), for example See FIG. 1b of U.S. Pat. No. 8,028,993 (this figure of which is incorporated by reference herein). When spun, the roulette is configured to provide an equal probability of the ball landing on each section (number).

Initial cash deposits can be made into the electronic gaming machine which converts cash into electronic credits. Wagers can be placed in the form of electronic credits, which can be cashed out for real coins or a ticket (e.g., ticket-in-ticket-out) which can be redeemed at a casino cashier or kiosk for real cash and/or coins.

Figure 2:
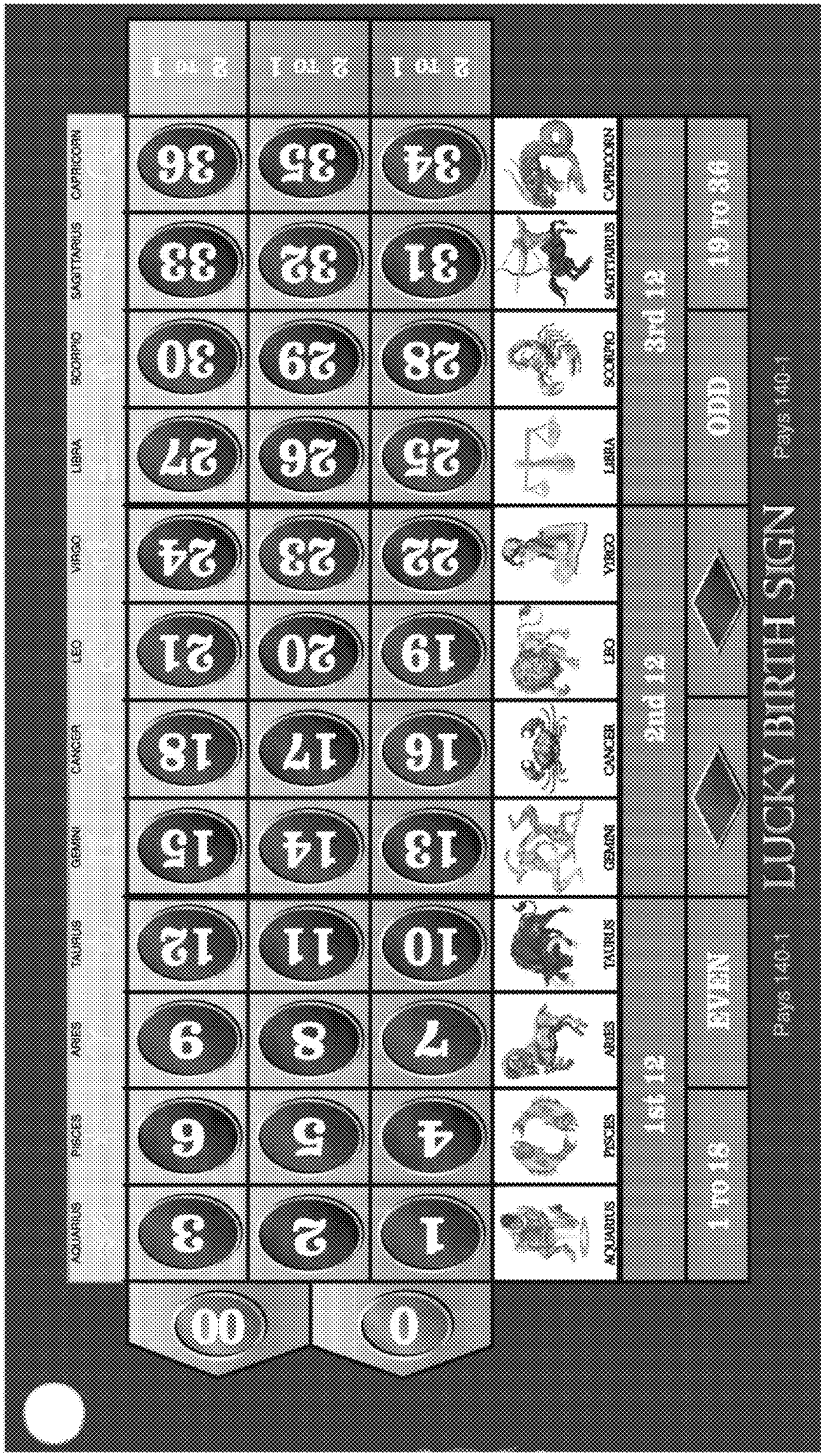
FIG. 2 is a drawing of a roulette layout, according to an embodiment.

FIG. 2 is a drawing of a roulette betting layout, according to an embodiment.

Note that the betting layout looks like a standard roulette layout but has an additional column of twelve bonus symbols. The bonus symbols can be zodiac symbols, birth year symbols, or any other symbol (all such symbols should be unique). Each bonus symbol has an associated row, for example in FIG. 2, the Aquarius symbol is associated with only the numbers in the first row (numbers 1, 2, and 3). The Capricorn symbol is associated with only the numbers in the last row (numbers 34, 35 and 36). All of the other symbols are only associated with their respective numbers as illustrated in FIG. 2. Note that the zeros ("0" and "00") are not associated with any of the twelve bonus symbols.

Thus, if a player bets a bonus wager on the Capricorn, then the player will hope that any of the numbers 34, 35 or 36 would occur consecutively (the same number does not necessarily have to occur consecutively but any one out of the associated three numbers should occur consecutively to win).

In the physical version, the layout illustrated in FIG. 2 would be printed on a felt which utilizes physical chips to take wagers. In an electronic version, the layout illustrated in FIG. 2 would be displayed on an electronic output device and the player can make wagers by utilizing a GUI (graphical user interface) to make the wagers (e.g., by touching the electronic output device (which can be a touch-screen) to indicate which symbol to bet on and how much the wager would be. Note that when the ball (the ball in the roulette wheel) lands on a number corresponding to a particular bonus symbol, then it can be considered that the ball landed on the bonus symbol as well (or that that bonus symbol "won" in the last spin), so for example it would be proper to say "the ball landed on Pisces" when the ball landed on number 4, 5 or 6.

Figure 3:
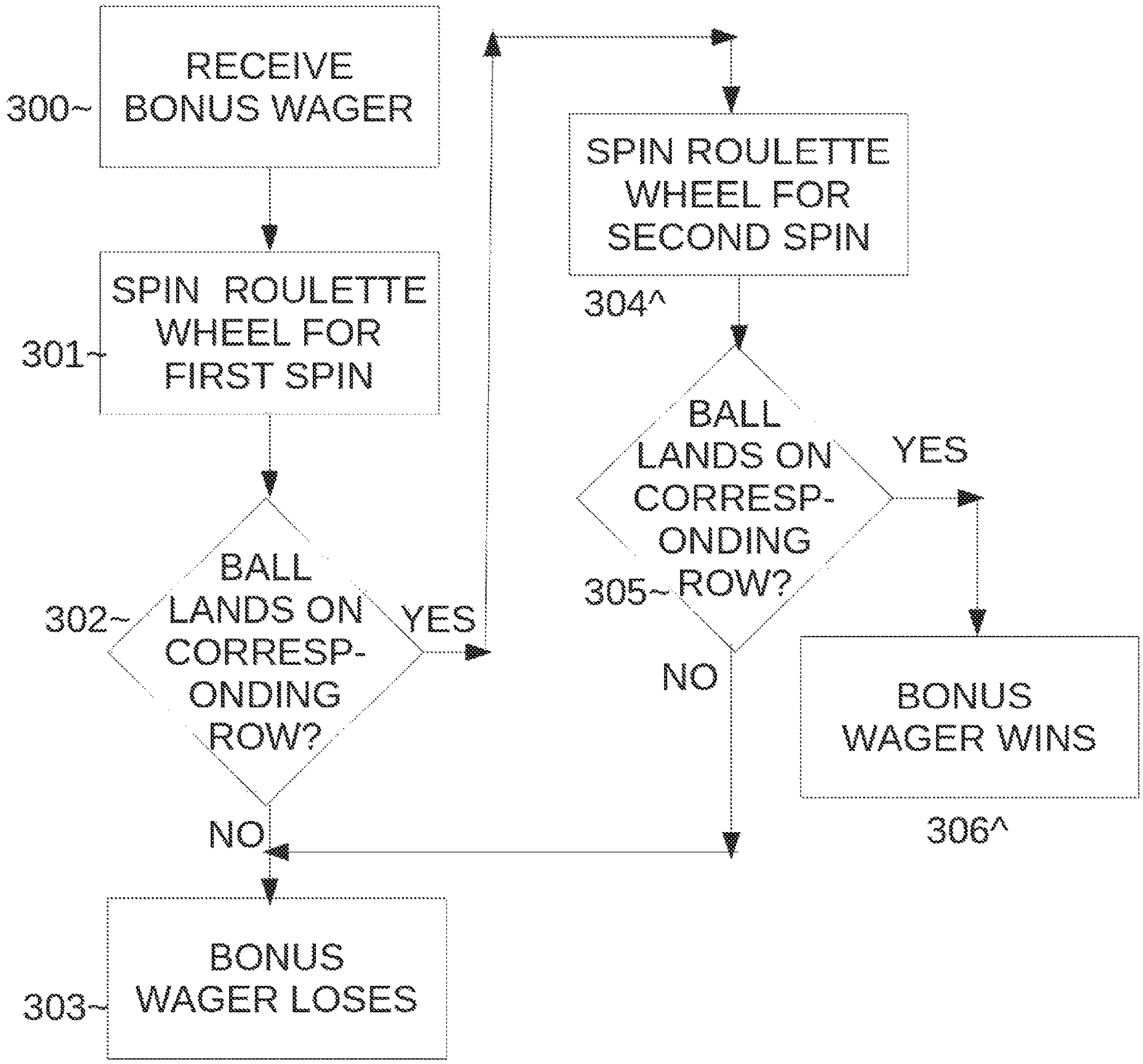
FIG. 3 is flowchart illustrating an exemplary method of implementing a wagering method, according to an embodiment.

FIG. 3 is flowchart illustrating an exemplary method if implementing a wagering method, according to an embodiment.

The method can begin with operation 300, wherein the game receives the bonus wager from the player. In a physical version using a physical roulette wheel the wager can be made in the form of chip(s) which are directly redeemable for cash (e.g., a casino). In an electronic version, the wager can be made using virtual chips displayed on an electronic output device. In addition to the bonus wager described herein, all standard roulette bets can be made as well (e.g., betting on individual numbers, colors, odd/even, red/black, etc.) Each bonus wager would have two characteristics, which bonus symbol the bonus wager is on and how much the wager is. The player is free to bet on as many bonus symbols as the player wishes. Of course, typically each bonus wager would have an inherent house edge so in the long run the player is expected to lose. The player can choose any bonus symbol to wager on and any amount for the wager (subject to any maximum bet limit set by the casino).

From operation 300, the method proceeds to operation 301, wherein the roulette wheel is spun. In the physical game, a dealer would physically spin the wheel until it stops. In the electronic version, the player would press a displayed "spin" button which would initiate the wheel spinning (utilizing computer animation) which would stop on a random number (determined by an electronic random number generator).

From operation 301, the method proceeds to operation 302, which determines whether the ball (from the first spin) landed on a corresponding row. The corresponding row is the row of symbols associated with the bonus symbol which the bonus wager was placed on. For example, from FIG. 2, if the player made the bonus wager on the Taurus symbol, the associated row consists only of the numbers 10, 11 and 12. Thus if the ball landed in 10, 11, or 12 then this would mean the ball landed in the corresponding row. If the ball landed in any other number (i.e., 0, 00, 1-9, 13-36) then the ball did not land in the corresponding row. If the ball landed in the corresponding row then it does not matter which actual number the ball landed on.

If the ball did not land on the corresponding row, then the method proceeds to operation 303, wherein the bonus wager loses and is collected by the house. In the physical version, the dealer would physically collect the chip. In the electronic version, the software running the game would electronically collect the bonus wager.

In operation 302, if the ball landed in the corresponding row, then the method proceeds to operation 304 which spins the roulette wheel for the second spin. This is done in the same manner as operation 301. Note that in this operation, the bonus wager that was placed is already "half-way" there to winning (since one spin was successful although the bonus wager needs two spins to win). Thus, the bonus wager at this point in the game can be marked, for example in the physical game the dealer can place a lammer or some sort of marker on the bonus wager (or near it) to indicate that this particular bonus wager has already achieved one successful spin. In this way, upon a "half-way" wager achieving a subsequent successful result, the dealers would know to pay this bonus wager. A newly placed bonus wager (before any spin) would not have such a marking so the dealers would know such a bonus wager has not had a successful spin yet. In the virtual version, the display can also mark a bonus wager that has had one successful spin, but in any case the programming should electronically track which bonus wagers have had a successful spin so the computer would know which bonus wagers would be winning ones (and hence get paid) upon undergoing a successful spin.

From operation 304, the method proceeds to operation 305, which determines whether the ball (from the second spin) landed on the corresponding row (this can be done as described with regard to operation 302).

If in operation 305, the ball did not land on the corresponding row, then the method proceeds to operation 303.

If in operation 305, the ball did land in the corresponding row, then the method proceeds to operation 306. The player has won the bonus wager. There would be a fixed predetermined payout for every winning bonus wager (e.g., 150:1). Thus, for example, if the player bet $1 on the bonus wager and won, the player would be paid $150. In the physical version, the player would receive $150 in physical chips. In the virtual version, the computer software would add $150 to the player's point total.

An example of the game will now be presented. A player makes a number of standard roulette bets which are resolved independent of the bonus wager. The player also makes a $1 wager on the Pisces bonus symbol. The roulette wheel spins and the ball lands on number 2. The number 2 is not associated with the Pisces bonus symbol. The bonus wager loses and is collected by the house (the player loses the $1 with no winnings).

As another example, the player makes a $1 wager on the Pisces bonus symbol. The roulette wheel is spun and the ball lands on the number 4. Since the number 4 is associated with the Pisces bonus symbol, the bonus wager remains live. The roulette wheel is spun again and lands on the number 16. Since the number 16 is not associated with the Pisces bonus symbol, the bonus wager loses and is collected by the house (the player loses the $1 with no winnings).

As a further example, the player makes a $1 wager on the Pisces bonus symbol. The roulette wheel is spun and the ball lands on the number 4. Since the number 4 is associated with the Pisces bonus symbol, the bonus wager remains live. The roulette wheel is spun again and lands on the number 6. Since the number 6 is associated with the Pisces bonus symbol (it is in the corresponding row), the bonus wager has now won and is paid the predetermined payout (e.g., $150). The player wins $150 and also gets to keep his/her original $1 wager. The bonus wager has now been resolved.

In a further embodiment, the bonus wager can pay multiple times whenever the ball lands on the winning symbol (e.g., a number in the row corresponding to the symbol selected by the player also referred to as a winning symbol row number). A different payout can be paid for spins where the ball lands on a number in the row corresponding to the winning symbol at different time (e.g., the payout for the second time the ball lands on the winning symbol row number can be higher than the payout for the first time the ball lands on a winning symbol row number). For example, if the player bets his/her bonus wager on "Scorpio" (the winning symbol) then if the ball lands on a number in the Scorpio row the first spin a payout will be made, and if the ball lands again on a number in the Scorpio row (twice in a row) then another payout can be made which is higher than the first payout. The bonus wager would be live and would continuously be paid as long as the ball continuously lands on a Scorpio row number without it landing on any other symbol.

Figure 4:
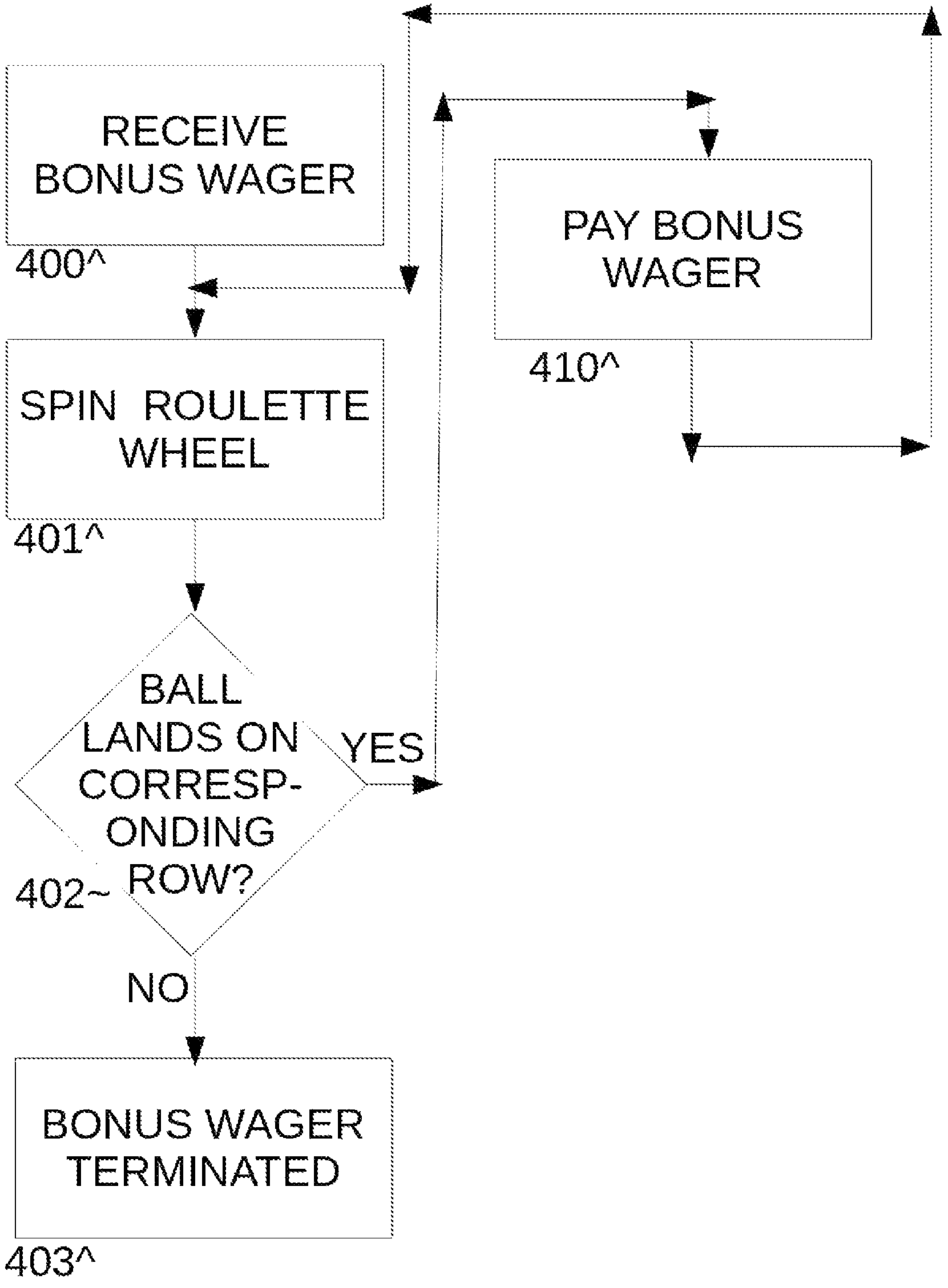
FIG. 4 is a flowchart illustrating an exemplary method of implementing a wagering method with multiple payouts, according to an embodiment.

FIG. 4 is a flowchart illustrating an exemplary method of implementing a wagering method with multiple payouts, according to an embodiment.

FIG. 4 is similar to FIG. 3 but allows the player to earn multiple payouts (one payout each time the ball lands on row number corresponding to the selected symbol the player selected). Many operations in FIG. 4 are performed similarly or the same as their corresponding operations in FIG. 3.

In operation 400, a bonus wager is received from the player. This is performed as in operation 300. A player (physically or virtually) places a wager (e.g., a chip) onto a selected bonus symbol (e.g., Scorpio, Pisces, etc.) which represents a set of numbers on the roulette layout/wheel. Of course, the symbols of the zodiac are only one possible set of symbols/indicia and any other symbols can be used as well.

From operation 400, the method proceeds to operation 401, wherein the dealer (or computer) spins the roulette wheel. This can be done as in operations 301/304.

From operation 401, the method proceeds to operation 402, which determines whether the ball landed on a correspond row (in other words, landed on the symbol the player selected in operation 400).

If (in operation 402) the ball did not land on corresponding row to the selected symbol (the symbol the player bet the bonus wager on in operation 400), then the method proceeds to operation 403 and the bonus wager is now terminated with no further payout made at this point on the bonus wager (one or more payout(s) could have already been made on the bonus wager if the ball had already landed on the corresponding row to the selected symbol in the same game). The bonus wager the player made in operation 400 can be removed from the playing felt. For example, if the player bet on a selected symbol and the first spin (after the player made the bet) results in the ball landing on a number in a row that does not corresponding to the selected symbol that the player bet on, then the bonus wager loses and is taken from the player with the player winning (getting) $0 (this is a net loss for the player). Thus, when the player makes the bonus wager, the roulette ball must continuously keep landing on selected bonus symbol that the player chose to make the wager on (and physically placed the wager on) otherwise the bonus wager is terminated (taken) and can no longer win.

If in operation 402, the ball did land on the corresponding row to the selected symbol, then the method can proceed to operation 410, which makes a payout to the player on the bonus wager. The payout can be made based on a predetermined paytable (for example Table I), which can pay different amounts based on which time the ball landed on the corresponding row to the selected symbol in operation 401 (e.g., the first time (spin) can pay X, the second time can pay Y, the third time can pay Z, etc., with Z>Y>X).

Table I below illustrated one set of example paytables that can be used. While 30 possible paytables are shown, only 1 would be selected and utilized for the game (before the game is offered to the player). In this way, all players will know what the payable is before they place their bonus wager. The paytables in Table I are intended to be used for a double-zero roulette game, although any paytables can be used that would provide the house an advantage on the bonus wager.

TABLE I

| Paytable # | First Spin Pay | Additional Spin Pay |
|---|---|---|
| 1 | 6 | 50 |
| 2 | 6 | 55 |
| 3 | 6 | 60 |
| 4 | 6 | 65 |
| 5 | 6 | 70 |
| 6 | 5 | 60 |
| 7 | 5 | 65 |
| 8 | 5 | 70 |
| 9 | 5 | 75 |
| 10 | 5 | 80 |
| 11 | 4 | 70 |
| 12 | 4 | 75 |
| 13 | 4 | 80 |
| 14 | 4 | 85 |
| 15 | 4 | 90 |
| 16 | 3 | 85 |
| 17 | 3 | 90 |
| 18 | 3 | 95 |
| 19 | 3 | 100 |
| 20 | 3 | 105 |
| 21 | 2 | 95 |
| 22 | 2 | 100 |
| 23 | 2 | 105 |
| 24 | 2 | 110 |
| 25 | 2 | 115 |
| 26 | 1 | 105 |
| 27 | 1 | 110 |
| 28 | 1 | 115 |
| 29 | 1 | 120 |
| 30 | 1 | 125 |
| 31 | 0 | 120 |
| 32 | 0 | 125 |
| 33 | 0 | 130 |
| 34 | 0 | 135 |
| 35 | 0 | 140 |

In double zero roulette, the probability of a win per spin is approximately 0.0789 and the probability of additional wins is 0.0067. In triple zero roulette (the wheel has three zeros instead of two), the probability of a win per spin is approximately 0.0769 and the probability of additional wins is 0.00641. The reason the probabilities are higher for double zero roulette is that there are no bonus symbol corresponding to the zeros, which improves the chances of winning slightly in the double zero version versus the triple zero version.

The payout in operation 410 would vary based on which spin resulted in the ball landing in/on the corresponding row to the elected symbol. For example, utilizing paytable 1 in Table I, if the player bets a $1 bonus wager on Pisces, and the first (next spin after the bonus wager was placed) results in the ball landing in a Pisces corresponding row, then the player is paid $5 (5:1) which the player keeps while the $1 bonus wager remains on the felt (Pisces betting area). If the next (second) spin results again in Pisces (the ball landing in a Pisces corresponding row), the player is now paid $65 (65:1) and the $1 bonus wager remains on the felt. If the next (third) spin results again in Pisces, the player is now paid $65 (65:1) and the $1 bonus wager remains on the felt. If the next (fourth spin) results in Scorpio (a row corresponding to Scorpio which is not a Pisces corresponding row), since this is not the selected symbol the player initially bet the bonus wager on, the $1 bonus wager that the player placed on Pisces is now terminated (collected by the house) and the player is not entitled to any further payouts.

The casino may utilize a tracking mechanism in order for the casino to know which number spin that the selected symbol resulted (the ball landed in a corresponding row) so that the proper payout can be made. For example, a lammer (marker) can be added to each bonus wager upon each successful (winning) spin. Thus, if the selected symbol landed on the first spin (the first spin is a number in a row corresponding to the selected symbol), a single lammer can be placed on top of or alongside the respective bonus wager. If the selected symbol lands on the second spin, a second lammer can be placed on top of or alongside the respective bonus wager, and so on. In this manner, when a payout is made on a winning bonus wager (in operation 410), the number of lammers can be counted to determine which numbered spin has occurred. If the payouts on the paytable being used is the same for spins two and afterwards then only one such marker/lammer need be used (i.e., if no lammers are present on a winning bonus wager then it is the first spin, and if one lammer is present on a winning bonus wager then it is the second (or later) spin.

In an optional embodiment, a special output device can be utilized to display the symbol corresponding to the row that the ball most recently landed on (winning symbol). The sign can also optionally display any combination of the following: the current payouts for the paytable being used; how many consecutive times the last winning symbol (where the ball landed last); audio can be used to announce the winning symbol; music can be played at all other times (when a voice is not announcing the winning symbol). The sign can use digital technology (e.g., LCD, LED, etc., to display any information).

Figure 5A:
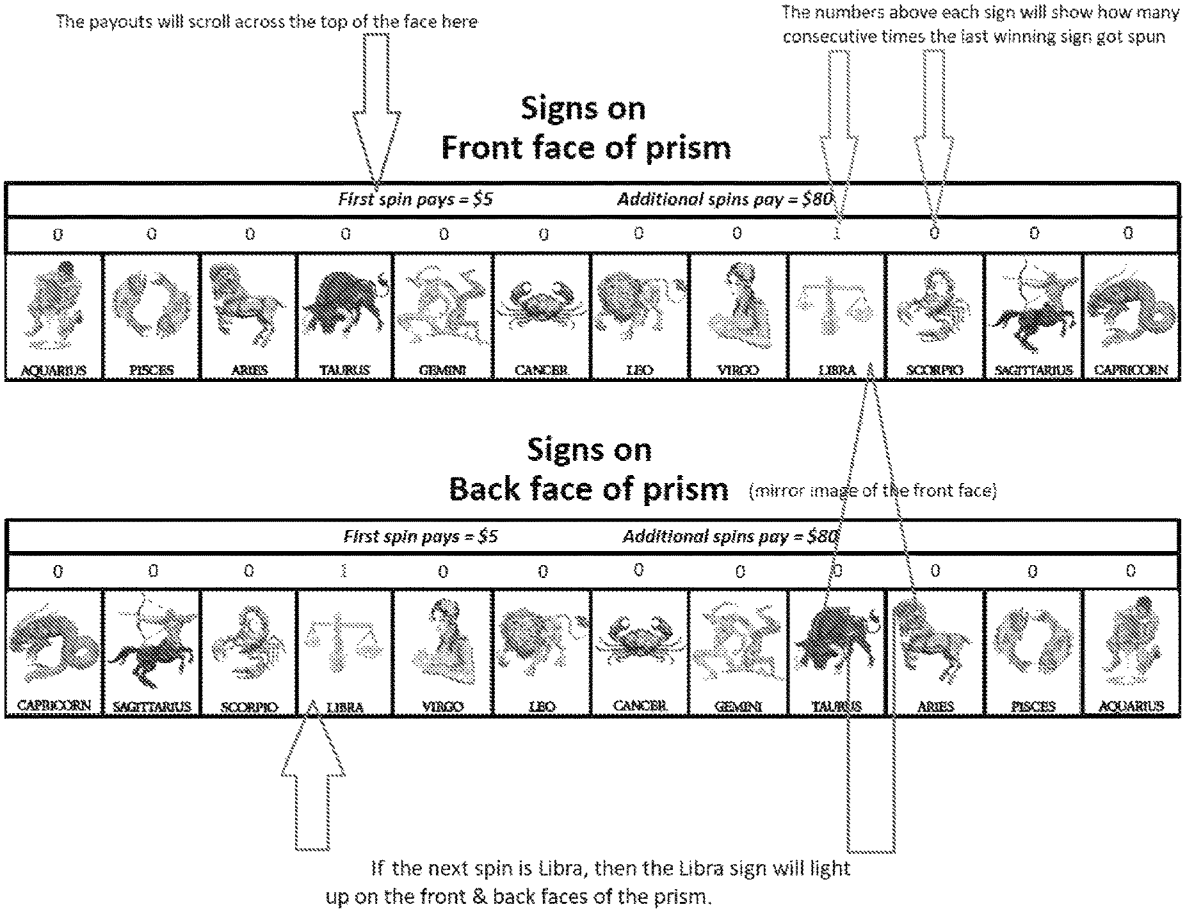
FIG. 5A is a drawing of faces of a prism with indicia therein, according to an embodiment.

FIG. 5A is a drawing of faces of a prism with indicia therein, according to an embodiment.

The output device can be a prism (or any other shape such as a rectangle, square, etc.). The symbols/indicia that the player can select to player the bonus wager on can be permanently printed onto the output device with the winning symbol (the symbol associated with the number the ball last landed on) being lit up (using a light inside the output device). Alternatively, each face of the output device can be an electronic output device (such as an LCD, etc.) which would light up the last winning symbol.

The winning symbol (corresponding to a row in which the ball last landed on) would be lit up on the front face and back face of the output device. Both faces can also display the current paytable being used (e.g., "first spin pays $5, additional spins pay $80"). A number above the winning symbol can also display how many times this symbol was a winning symbol consecutively (e.g., the first time a symbol was a winning symbol the number would display "1" (while all other symbols would display "0"), the second time a symbol was a winning symbol the number would display "2", etc.)

Figure 5B:
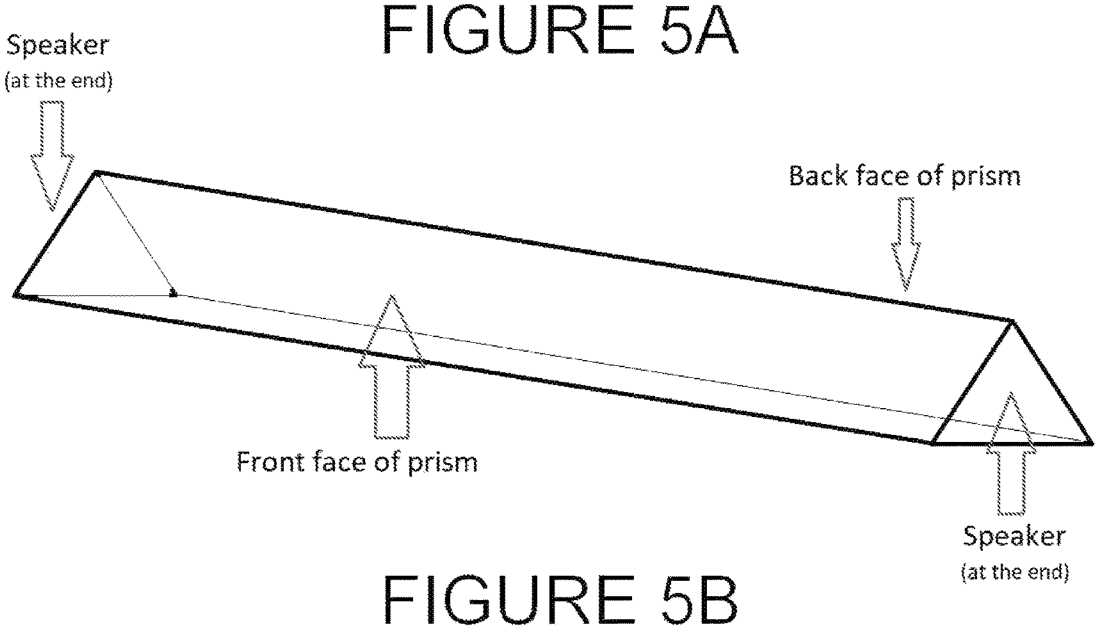
FIG. 5B is a drawing of a prism incorporating an output display, according to an embodiment.

FIG. 5B is a drawing of a prism incorporating an output display, according to an embodiment.

Shown is a 3-dimensional prism which can be placed on or alongside the felt roulette layout where the wagers are made. Speakers can optionally be present on each side of the output device. As discussed, other shapes besides a prism can be used. In one embodiment, the prism can be made of clear plastic (or any other suitable material, such as glass, etc.) with twelve printed indicia for each of the twelve bonus symbols with twelve lights behind the indicia, so that the bonus symbol that most recently occurred (on the last spin) is lit up by a corresponding light. In another embodiment, each of the two faces of the prism is an electronic output device (e.g., LCD, OLED, etc.) which lights up the bonus symbol of the symbol that most recently occurred.

As an example of the embodiment which utilizes multiple payouts is as follows. Jack places a $1 bonus wager on Scorpio (and other standard roulette bets as well which are handled as known in the art). The wheel spins and the result is 1 (e.g., the ball lands on the number 1 on the roulette wheel). Since 1 corresponds to Aquarius, the bonus wager loses and is taken.

As another example of the embodiment which utilizes multiple payouts (utilizing Paytable 1 from Table I), Jill places a $1 bonus wager on Scorpio (and any other standard roulette bets). The wheel spins and lands on 29. Since number 29 corresponds to Scorpio because it is in the same row (see FIG. 2), the player is now paid $6 and the bonus wager remains live on the table. The wheel spins again and lands on 28. Since 28 corresponds to Scorpio and this is the second consecutive winning spin (occurrence of Scorpio), the player is now paid $50 and the bonus wager still remains live. The wheel spins again and lands on 28. Since 28 corresponds to Scorpio and this is at least the second consecutive winning spin, the player is paid another $50 and the bonus wager still remains live. The wheel spins again and lands on 33. Since 33 does not correspond to Scorpio, the bonus wager now loses. The player has been paid $106 which the player keeps while the player has lost his/her $1, for a net profit of $105.

The methods described herein can be applied to any type of roulette game, whether "single zero", "double zero", "triple zero", etc.

Any description of a component or embodiment herein also includes hardware, software, and configurations which already exist in the prior art and may be necessary to the operation of such component(s) or embodiment(s).

Further, the operations described herein can be performed in any sensible order. Any operations not required for proper operation can be optional. Further, all methods described herein can also be stored on a computer readable storage to control a computer. All variations and features described herein can be combined with any other features described herein without limitation.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method to play a roulette game, comprising:

providing a physical roulette wheel comprising 38 sections and ball and a betting layout printed on felt comprising twelve unique bonus symbols, wherein the betting layout further comprises twelve rows, each row of the twelve rows comprising three numbers and one respective bonus symbol out of the twelve unique bonus symbols, wherein each section out of the 38 sections on the physical roulette wheel corresponds to one number on the betting layout;

receiving a bonus wager on a selected bonus symbol on the betting layout printed on felt out of the twelve unique bonus symbols;

spinning the roulette wheel a first time resulting in a first result;

spinning the roulette wheel a second time resulting in a second result;

providing wager resolution rules comprising if the first result is in a same row as the selected bonus symbol and the second result is in the same row as the selected bonus symbol then the bonus wager wins and is paid a payout; and resolving the bonus wager based on the wager resolution rules.

2. The method as recited in claim 1, further comprising spinning the roulette wheel a third time resulting in a third result, wherein the wager resolution rules further comprise that if the third result is in the same row as the selected bonus symbol then the bonus wager is paid an additional payout.

3. The method as recited in claim 1, further comprising displaying a number representing a number of times the selected bonus symbol has consecutively won.

* * * * *